(12) United States Patent
Hinrichs (10) Patent No.: US 10,176,152 B2
(45) Date of Patent: Jan. 8, 2019

(54) METHOD AND SYSTEM FOR ASSIGNING A CONTENT ITEM AS A LINK TARGET TO A MANAGED OBJECT

(71) Applicant: Open Text SA ULC, Halifax (CA)

(72) Inventor: Henning Hinrichs, Oldenburg (DE)

(73) Assignee: Open Text SA ULC, Halifax (CA)

( * ) Notice: Subject to any disclaimer, the term of this patent is extended or adjusted under 35 U.S.C. 154(b) by 0 days.

(21) Appl. No.: 14/804,697

(22) Filed: Jul. 21, 2015

(65) Prior Publication Data

US 2016/0034431 A1    Feb. 4, 2016

(30) Foreign Application Priority Data

Jul. 31, 2014    (EP) ..................... 14179384

(51) Int. Cl.
*G06F 3/00* (2006.01)
*G06F 17/22* (2006.01)
*G06F 17/30* (2006.01)
*G06F 3/0482* (2013.01)
*G06F 3/0484* (2013.01)
*G06F 17/21* (2006.01)
*G06F 17/24* (2006.01)

(52) U.S. Cl.
CPC ........ *G06F 17/2235* (2013.01); *G06F 3/0482* (2013.01); *G06F 3/04842* (2013.01); *G06F 3/04847* (2013.01); *G06F 17/212* (2013.01); *G06F 17/2247* (2013.01); *G06F 17/24* (2013.01); *G06F 17/3089* (2013.01)

(58) Field of Classification Search
CPC .. G06F 17/2235; G06F 3/0482; G06F 17/212; G06F 17/2247; G06F 17/3089; G06F 17/30893; G06F 17/24; G06F 17/30905; G06F 17/2229; G06F 3/04842; G06F 3/04847
See application file for complete search history.

(56) References Cited

U.S. PATENT DOCUMENTS

2005/0050021 A1 * 3/2005 Timmons .......... G06F 17/30899
2008/0201378 A1 * 8/2008 Nagahara ........... H04N 1/00411
(Continued)

OTHER PUBLICATIONS

"User Guide to the OpenText Content Management System: A guide to OpenText's website editing capabilities for EERE editors, developers, and QAers," Apr. 2011, pp. 1-101.*

*Primary Examiner* — Kyle R Stork
(74) *Attorney, Agent, or Firm* — Sprinkle IP Law Group (57) ABSTRACT

A smart link selection invention for assigning a content item as a link target to a managed object in a web content project of a web content management system. The web content project comprises at least one content page having content item(s). The method comprises accessing, in response to a user request, at least part of a managed object; generating a preview of the at least one content page; adding metadata to the generated preview; adding at least one selection means to the generated preview, the at least one selection means enabling selection of at least one content item; displaying the preview with the at least one selection means; selecting, in response to a user request, at least one content item from the generated preview; determining an identifier of the selected content item based on the metadata; and storing the identifier as the link target with the managed object.

20 Claims, 8 Drawing Sheets

(56) References Cited

U.S. PATENT DOCUMENTS

| | | | |
|---|---|---|---|
| 2012/0131683 A1* | 5/2012 | Nassar | G06F 17/301 726/28 |
| 2012/0209922 A1* | 8/2012 | Bhatia | H04L 51/08 709/206 |
| 2014/0195516 A1* | 7/2014 | Balakrishnan | G06F 17/30126 707/722 |
| 2014/0214856 A1* | 7/2014 | Mahkovec | G06F 17/30073 707/747 |
| 2015/0154156 A1* | 6/2015 | Meyers, Jr. | G06F 17/2235 715/205 |

\* cited by examiner

METHOD AND SYSTEM FOR ASSIGNING A CONTENT ITEM AS A LINK TARGET TO A MANAGED OBJECT

CROSS-REFERENCE TO RELATED APPLICATION(S)

This application claims a benefit of priority from European Patent Application Serial No. 14179384.4, filed Jul. 31, 2014, which is fully incorporated by reference herein.

TECHNICAL FIELD

The disclosure relates generally to a web content management method and system. More particularly, this disclosure relates to a method and system for assigning a content item as a link target to a managed object.

BACKGROUND OF RELATED ART

In web content management systems, content, or content items, can be linked to provide additional information such as background information or show relationship. These links are allowed to be created and used by users such as content editors in several scenarios. These scenarios can be classified using the following criteria: (1) the starting object that is the starting point of the link, the starting object being an object managed by the web content management system that can be assigned one or more target links, such as text elements, image assets, link objects, lists; (2) the editing tool used to access the starting object; (3) the type of the link target; and (4) the link selection tool used.

In common web content management systems, the link selection tool is a tool enabling the editor to code the link using web programming languages or markup languages such as the HyperText Markup Language (HTML), or an elaborated search tool. That is, the editor on the one hand needs to be aware of the content to be linked, in particular the search criteria, and on the other hand needs to have sufficient skills for handling the tool.

SUMMARY

There is still a desire and need for improved methods and systems for selecting and coding link targets in web content management systems. In particular, there is a desire and need to support editors in coding such that it is, for example, no longer necessary that an editor knows names or other technical criteria of a link target.

It is therefore an object of the invention to provide an improved method and system for selecting and coding link targets, enabling editors to assign a content item as a link target to a managed object without needing to know names or other technical criteria of the link target.

According to an aspect, a method of assigning a content item as a link target to a managed object in a web content project of a web content management system, the web content project comprises at least one content page having one or more content items, may include: accessing, in response to a user request, at least part of a content item to be assigned with a link target as a managed object; generating a preview of at least one content page; adding metadata to the generated preview, the metadata comprising information on one or more content items on the at least one content page; adding at least one selection means to the generated preview, the at least one selection means enabling selection of at least one of the content items; displaying the preview of the at least one content page with the at least one selection means to a user; selecting, in response to a user request, at least one content item from the generated preview by the at least one selection means; determining an identifier of the at least one selected content item based on the metadata; and storing the identifier as the link target with the managed object.

Thus, editing content of the web content project can be improved. In particular, editors are no longer required to know the names or other technical criteria of a link target. In addition, an editor can gain intuitive confidence to select a link target. With embodiments disclosed herein, it is further achieved that link targets can be managed by the web content management system as well.

In one example, the method further comprises verifying the at least one selected content item using the metadata. Optionally, the verifying comprises at least one of checking whether the at least one selected content item exists in the web content project, checking the type of the at least one selected content item, and/or checking permission of the at least one selected content item.

Thus, compliance with regard to the permissions and context requirements within the entire web content project can be ensured, even with respect to link targets.

In another example, the preview is generated for at least two content pages, and the generating the preview further comprises adding navigation elements to the preview to enable the user navigating through the at least two content pages.

Thus, an editor is enabled to navigate/surf through the web content project as it has been published but successively generating the preview requires less processing and storage capabilities. That is, the preview is available for display significantly faster.

According to another aspect, a system that assigns a content item as a link target to a managed object in a web content project comprising at least one content page having one or more content items is provided. The system comprises one or more processing devices configured to: access, in response to a user request, at least part of a content item to be assigned with a link target as a managed object; generate a preview of at least one content page; add metadata to the generated preview, the metadata comprising information on one or more content items on the at least one content page; add at least one selection means to the generated preview, the at least one selection means enabling selection of at least one of the content items; display the preview of the at least one content page with the at least one selection means to a user; select, in response to a user request, at least one content item from the generated preview by the at least one selection means; determine an identifier of the at least one selected content item based on the metadata; and store the identifier as the link target with the managed object.

In other examples, the one or more processing devices are further configured to verify the at least one selected content item using the metadata, check whether the at least one selected content item exists in the web content project, check the type of the at least one selected content item, and/or check permission of the at least one selected content item. Optionally, the preview is generated for at least two content pages, and the one or more processing devices are further configured to add navigation elements to the preview to enable navigating through previews of the at least two content pages.

In yet other examples of the method and system, the metadata comprises at least one of a content item identifier, type of the content item, visualization data of the content item, and location information defining a location of the content item in the preview of the at least one content page, the selection means comprises at least one of a button associated with the at least one of the content items, a list of content items enabled for selection on the content page, and marking means displayed when hovering with a pointing device over the preview, and/or the identifier of the at least one selected content item is a value of a href attribute of an anchor target. A href attribute is an HTML attribute known to those skilled in the art and thus is not further described herein.

In further aspects, a computer program product comprising computer-readable instructions which when executed by a processing device causes the processing device to execute the method of assigning a content item as a link target to a managed object in a web content project, and a non-transient machine-readable medium having embodied thereon the computer program product are provided.

Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description.

Embodiments discussed herein can be implemented in suitable computer-executable and/or machine-executable instructions that may reside on a non-transitory computer-readable and/or a machine-readable medium (e.g., a hard disk (HD)), hardware circuitry or the like, or any combination.

The invention generally pertains to content management methods and systems, including web content management methods and systems. In particular, the invention pertains to a method and system of assigning a content item as a link target to a managed object in a web content project of a web content management system.

A content management system (CMS) is an application, usually computer-implemented, that allows publishing, editing and modifying content, organizing, deleting as well as maintenance from a central interface. CMSs usually provide procedures to manage workflow in a collaborative environment. Most systems use a content repository or a database to store page content, metadata, and other information assets that might be needed by the CMS.

Most of the CMSs are used to run websites containing blogs, news, and shopping. Such CMSs are called web content management systems (WCMSs). A WCMS usually is a software system that provides website authoring, collaboration, and administration tools designed to allow users with little knowledge of web programming languages or markup languages to create and manage website content with relative ease.

WCMSs can manage objects of various types, such as content items (e.g., texts, assets, including objects of user-defined types), and structural items, such as attributes of other objects, references to other objects used to build the web content project structure. For some structural object types, editors can specify content items during editing them.

A managed object, insofar as used as a starting object for the method in accordance with an embodiment of the invention, (also referred to as starting object or content object) is an object managed by a WCMS that can be assigned one or more links, such as text elements, image assets, link objects, lists, or the like.

A digital asset is any item of text or media that has been formatted into a binary source. Digital assets are usually categorized in three major groups: textual content (digital assets), images (media assets) and multimedia (media assets). In the field of WCMSs, structural elements such as style sheets, or the like, are understood as assets as well.

For the purpose of illustration, non-limiting embodiments of the invention are explained in more detail below with reference to the accompanying drawings.

Figure 1:
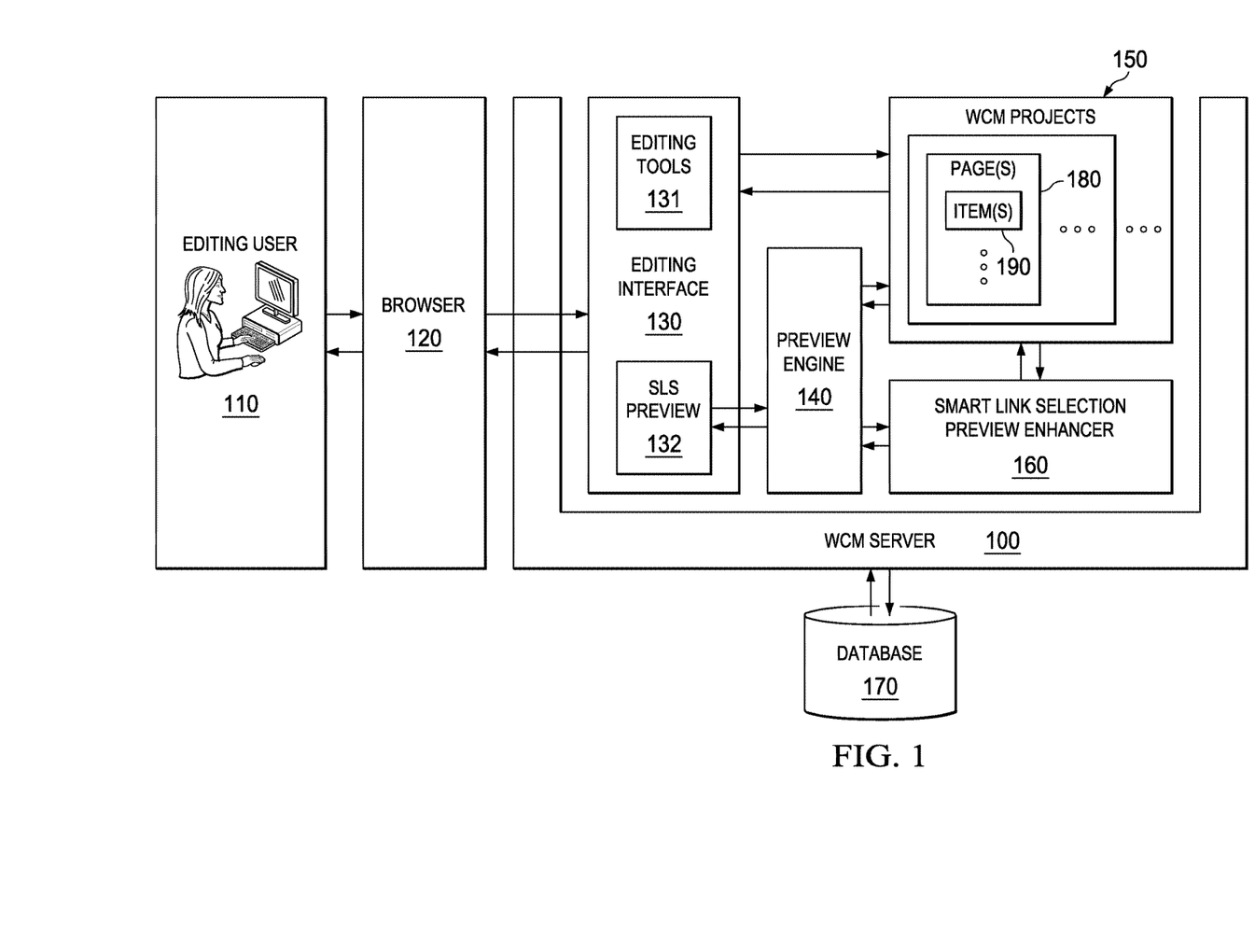
FIG. 1 depicts a diagrammatic representation of an example web content management system according to one embodiment.

In FIG. 1, an example of a web content management system according to one embodiment is illustrated. Skilled artisans appreciate that some embodiments (referred to herein as Smart Link Selection, or the SLS function) can be part of the WCMS shown in FIG. 1.

In the example of FIG. 1, the WCMS comprises a web content management server 100, a browser 120, an editing interface 130, a preview engine 140, a SLS preview enhancer 160, and a database 170. In some embodiments, web content management server 100, browser 120, editing interface 130, preview engine 140, and SLS preview enhancer 160 are software applications that are part of the software system constituting the WCMS, executed by one or more processing devices such as a mobile terminal device, laptop, computer, server, PDA, smartphone, or the like. Database 170 comprises a processing device such as a server, or the like, on which a database management system software is executed and a storage device such as a hard disk, or the like, in communication with the processing device. Browser 120 can be, for example, Microsoft's Internet Explorer, Google's Chrome browser, Apple's Safari browser, or the like.

Web content management server 100 manages web content projects 150 stored in database 170. An editing user 110 communicates with web content management server 100 via a communication network such as a Local Area Network, a mobile communication network, the Internet, or any other suitable communication connection. Editing user 110 uses browser 120 to access editing interface 130 of the WCMS. User 110 selects an editing tool 131 to edit an object managed by the WCMS (referred to as a managed object, starting object, or content object hereinafter) from a web content project 150 managed by the WCMS. One example of editing tool 131 can be a rich text editor. A SLS preview 132 is accessible by editing tool 131 to select a content item as a link target. Editing interface 130 further comprises preview engine 140 that is operable to generate a preview of web content project 150, or part thereof. For example, preview engine 140 may generate a preview of web content project 150 to which a starting object edited by user 110 belongs to. SLS preview enhancer 160 can be used by preview engine 140 to add metadata and selection means to the preview, which can be presented via editing interface 130 and browser 120 to user 110. A detailed description of the functions/operations performed by each part of the WCMS is provided below.

Figure 2:
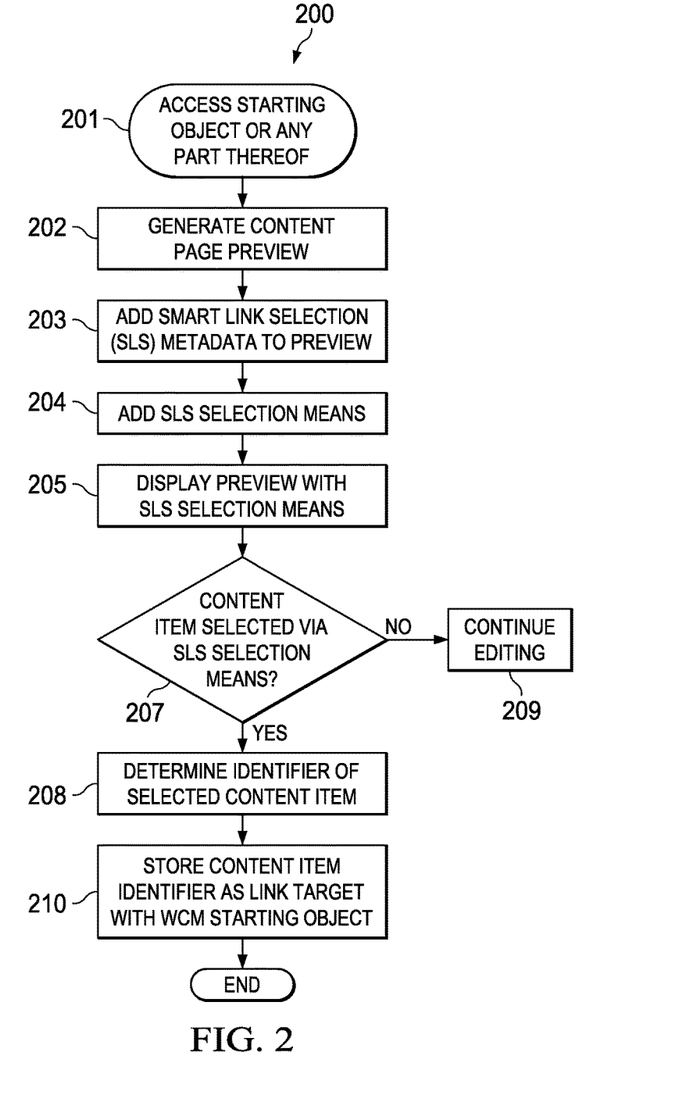
FIG. 2 is a flow diagram illustrating a method of assigning a content item as a link target to a managed object in a web content project, in accordance with one embodiment.

FIG. 2 shows a flow chart/diagram illustrating a method of assigning a content item as a link target to a managed object in a web content project. Method 200 illustrated in FIG. 2 is one exemplary embodiment of the invention (referred to as an SLS minimal method). Method 200 may be performed by one or more processing devices such as server, computer, laptop, or the like. In accordance with one example embodiment, method 200 may be performed by the WCMS shown in FIG. 1.

Web content project 150 managed by web content management server 100 may include at least one content page 180 having one or more content items 190. The at least one content page 180 and/or the one or more content items 190 are stored in database 170. Furthermore, a content item assigned as a link target to a managed object can be one of these one or more content items 190 stored in database 170. The managed object can be any object managed by the WCMS.

In the example of FIG. 2, method 200 starts at block 201. In block 201, at least a part of a content item managed by web content management server 100 and stored in database 170 is accessed by user 110 using editing tools 131 via browser 120. In more detail, user 110 may use editing tools 131 running in browser 120 to select or indicate a content item, or at least a part thereof, which is to be assigned with a link target. The content item, or at least the part thereof, is presented to user 110 by editing tools 131 via editing interface 130. Editing tools 130 enable user 110 to select and edit the content item, or the part thereof. A request to access the content item, or the part thereof, is issued. The request is communicated from browser 120 to editing tools 131. In response to receiving the request, the content item, or the part thereof, is accessed as a managed object.

Then, in block 202, a preview of at least one content page 180 of web content project 150 may be generated by preview engine 140. This can be performed automatically, or in response to a request issued by user 110 via browser 120. For example, preview engine 140 can generate the preview of only one content page such as a starting page, or all content pages, of web content project 150. Another alternative example will be described below.

After generating the preview, SLS metadata can be added to the preview by SLS preview enhancer 160, in block 203. The SLS metadata may include information of content item(s) 190 on content page(s) 180, in the preview. For example, the metadata may comprise at least one of a content item identifier, type of the content item, visualization data of the content item, and/or location information defining a location of the content item in the preview.

In block 204, SLS preview enhancer 160 may add at least one SLS selection means to the generated preview. The at least one SLS selection means can enable selection of at least one content item 190. For example, the SLS selection means may comprise at least one of a button associated with at least one content item 190, a list of content items 190 enabled for selection on content page 180, and/or marking means displayed when hovering over the preview with a pointing device such as a mouse device, or the like.

After adding the SLS metadata and the SLS selection means, the preview is presented or otherwise displayed with the SLS selection means to user 110 via editing interface 130 and browser 120, in block 205. As a specific example, the preview can be displayed in browser 120 as a content page.

In block 207, user 110 may select at least one content item 190 from the preview displayed via editing interface 130 and browser 120. To be more specific, user 110 may select at least one content item 190 using the SLS selection means added to the preview by SLS preview enhancer 160. In the above example of the SLS selection means implementing a button associated with content item 190, user 110 may select or click on the button to select content item 190 associated therewith. In another example, a list containing content items 190 in content page 180 displayed to user 110 and enabled for selection is presented to user 110 via editing interface 130 and browser 120. User 110 may select one or more content items 190 from the list.

In block 209, if no content item 190 on content page 180 is selected, method 200 may terminate, or may allow user 110 to further edit the managed object using editing tools 130.

If user 110 selects one or more content item(s) 190, an identifier of each selected content item 190, can be determined, in block 208. The determination can be based on the SLS metadata added to the preview of content page 180 for which the preview has been generated. For example, the identifier may be derived from a content item identifier contained in the SLS metadata. In one embodiment, the identifier thus determined by method 200 can be a value of a href attribute of an anchor target in case of using HTML.

In block 210, the identifier determined in block 208 is stored as a link target with the managed object described above with reference to block 201. For example, the identifier can be stored as part of the managed object in database 170.

As a result, when a content page including the managed object is processed for preview or display, the managed object is provided with a link to the content item (which was selected from the preview generated in block 202) as the link target. If, for example, user 110 selects or clicks on the managed object, more specifically the link, user 110 is transferred or otherwise directed to the previously selected content item (the link target), in a manner that is similar to hyperlinking in HTML. However, user 110 is free from having to code hyperlinking in HTML.

Additional examples of method 200 described above with reference to FIG. 2 will be described with reference to FIGS. 3 and 4.

Figure 3:
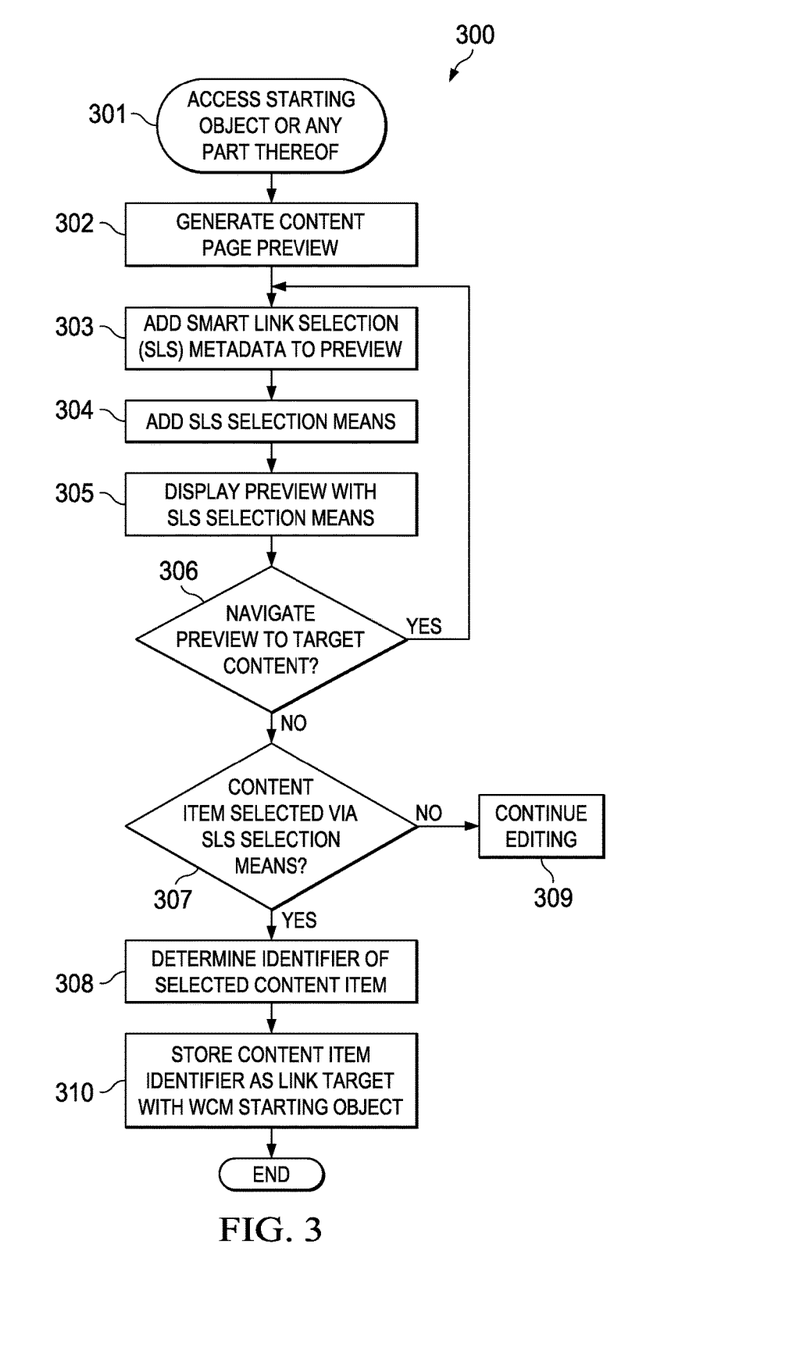
FIG. 3 is a flow diagram illustrating a method of assigning a content item as a link target to a managed object in a web content project, in accordance with another embodiment.

FIG. 3 shows a flow diagram illustrating a method of assigning a content item as a link target to a managed object in a web content project according to another exemplary embodiment of the invention. Method 300 illustrated in FIG. 3 (referred to as an SLS basic method) may include steps similar to those described above with reference to method 200 shown in FIG. 2. In more detail, blocks 301, 303, 304, 305, 307, 308, 309, and 310 may substantially correspond to blocks 201, 203, 204, 205, 207, 208, 209, and 210 of method 200 and, therefore, explanations of these steps are omitted here for the sake of brevity. Reference is respectfully made to the illustration and explanations of FIG. 2.

In block 302, the preview can be generated by preview engine 140. Here, the preview can be generated for more than one, or all, content pages 180 of web content project 150. For example, the preview of a starting page and each content page linked with the starting page can be generated. In more detail, it is determined whether the starting page (content page at the first stage) comprises content items being linked to content items of content pages different than the starting page (e.g., content pages at the second stage). Then, the preview of the starting page and the content pages different than the starting page can be generated. Thus, the preview may comprise more than one content page. Also, the preview can be generated for content pages at the third or any further stage. That is, in block 302, the content pages being linked to the content pages at the second stage are determined and included in the preview.

Further, in block 302, navigation elements can be added to the preview generated. The navigation elements enable user 110 to navigate through the content page(s) of the preview thus generated. As an example, the navigation elements can be hyperlinks in case of HTML. Also, the navigation elements can comprise buttons enabling user 110 to go to a previously displayed content page similar to the back button, or the starting page similar to the home button, both back and home buttons are known from commonly used Internet browsers. This enables user 110 seeking for a content item to be assigned as the link target to browse, surf, or otherwise navigate through the content pages of the preview, in block 306. If the content item to be assigned as the link target is found, method 300 continues with block 307.

In one particular example of the embodiment illustrated in FIG. 3, method 300 may continue with blocks 302, 303, 304 and 305 if user 110 tries to navigate to a content page for which no preview has been generated. For example, the preview of only the starting page is generated in block 302 and presented to user 110 in block 305, while at least one link to another content page for which the preview has not been generated is present in the starting page. Now, if user 110 clicks on the link to navigate to the other content page, in block 306, method 200 may loop back to block 302 and the preview of the other content page is generated. After adding the SLS metadata in block 303 and the SLS selection means in block 304, as described above with reference to FIG. 2, the preview of the other content page is displayed to user 110 in block 305. If no further navigation, method 300 may continue with block 307, which can be similar to block 207 described above with reference to FIG. 2.

Figure 4:
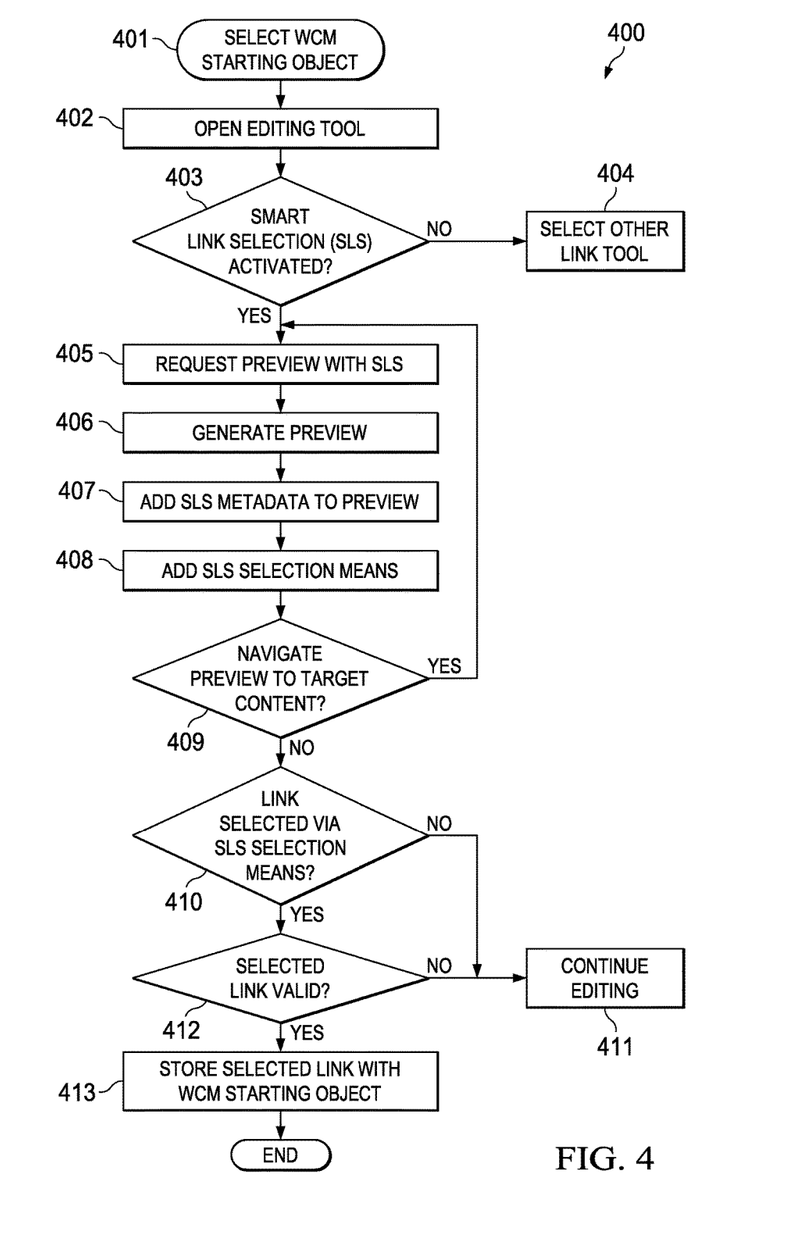
FIG. 4 is a flow diagram illustrating a method of assigning a content item as a link target to a managed object in a web content project, in accordance with yet another embodiment.

FIG. 4 shows a flow diagram illustrating a method of assigning a content item as a link target to a managed object in a web content project according to yet another exemplary embodiment of the invention. Method 400 illustrated in FIG. 4 (referred to as an SLS main scenario flow) may include steps similar to those described above with reference to method 200 shown in FIG. 2. In more detail, blocks 401, 405, 406, 407, 408, 410, 411, and 413 may substantially correspond to blocks 201, 203, 204, 205, 207, 208, 209, and 210 of method 200. Furthermore, block 409 may substantially correspond to block 306 of method 300 shown in FIG. 3. Detailed explanations of these steps are therefore omitted here for the sake of brevity. Reference is respectfully made to the illustrations and explanations of FIGS. 2 and 3.

In the example of FIG. 4, method 400 starts with the selection of a managed object (e.g., by user 110 shown in FIG. 1) in block 401. For this managed object, an editing tool 131 provided by the web content management system is opened in block 402. In block 403, method 400 may entail determining whether the SLS function is activated for editing tool 131 selected in block 402.

If the SLS function is not activated for editing tool 131 selected in block 402, another link selection tool must be used in block 404. Otherwise, using the SLS function, a preview of the web content project to which the managed object belongs to is requested from web content management server 100 in block 405.

Then, in block 406, web content management server 100 may generate the preview using preview engine 140. If a link target has been previously assigned to the managed object, the preview containing the content of this previously assigned link target is generated as well, if possible.

Before the preview is presented to editing user 110 via browser 120, SLS preview enhancer 160 may add SLS metadata in block 407 and SLS selection means in block 408 to the preview. The SLS metadata added to the generated preview can provide the SLS function with the information for mapping the selected content page, or part thereof, to the content item and present content items as being selectable. The SLS metadata may comprise at least one of content item identifiers, types, visualization data, and/or location information where the content item is displayed within the preview. The SLS selection means allow editing user 110 to select a link target by mapping the displayed preview, or parts thereof, to the content item using the metadata.

With these additions, the preview is presented to editing user 110 via SLS preview 132 running in browser 120. If the content item that editing user 110 wants to select as a link target is not presented (and hence is not selectable by the added SLS selection means) on the preview in block 409, editing user 110 can browse, surf, or otherwise navigate to another content page of the preview by using navigation elements provided in the preview (which can be presented similar to navigation links of the web content projects published website). This navigation may result in a new request to a preview of the other content page with the SLS function to web content management server 100 and method 400 loops back to block 405.

Web content management server 100 may repeat steps 406 to 408 for the preview with the other content page. Editing user 110 can repeat browsing, surfing, or navigating until editing user 110 reaches the preview of the content page that presents a desired link target to be selected, or can respectively be selected by the added SLS selection means. If editing user 110 does not select a link target this way in block 410, the SLS function can be terminated and/or editing by editing user 110 can be continued, in block 411.

If editing user 110 selects a link target using an SLS selection means in block 410, the SLS function, web content management server 100, or any other component of the WCMS, may operate to determine whether the selected link target is valid in the given context, in block 412. As an example, such a validation may include verifying whether the metadata of the selected content item correspond to an existing content item in the WCMS that has, if required, the correct type, permissions, and/or further attributes matching the context requirements. If so, an identifier of the selected link target is determined and stored with the managed object, for example, as a value of the href attribute of an anchor target wrapping the managed object, if the managed object is part of an HTML instance, in block 413. Otherwise, if the selected link target is not valid, the SLS function can be terminated and/or editing by editing user 110 can be continued, in block 411.

In FIGS. 5A to 5D, an example scenario of using a disclosed method and system in accordance with one embodiment of the invention is illustrated.

Figure 5A:
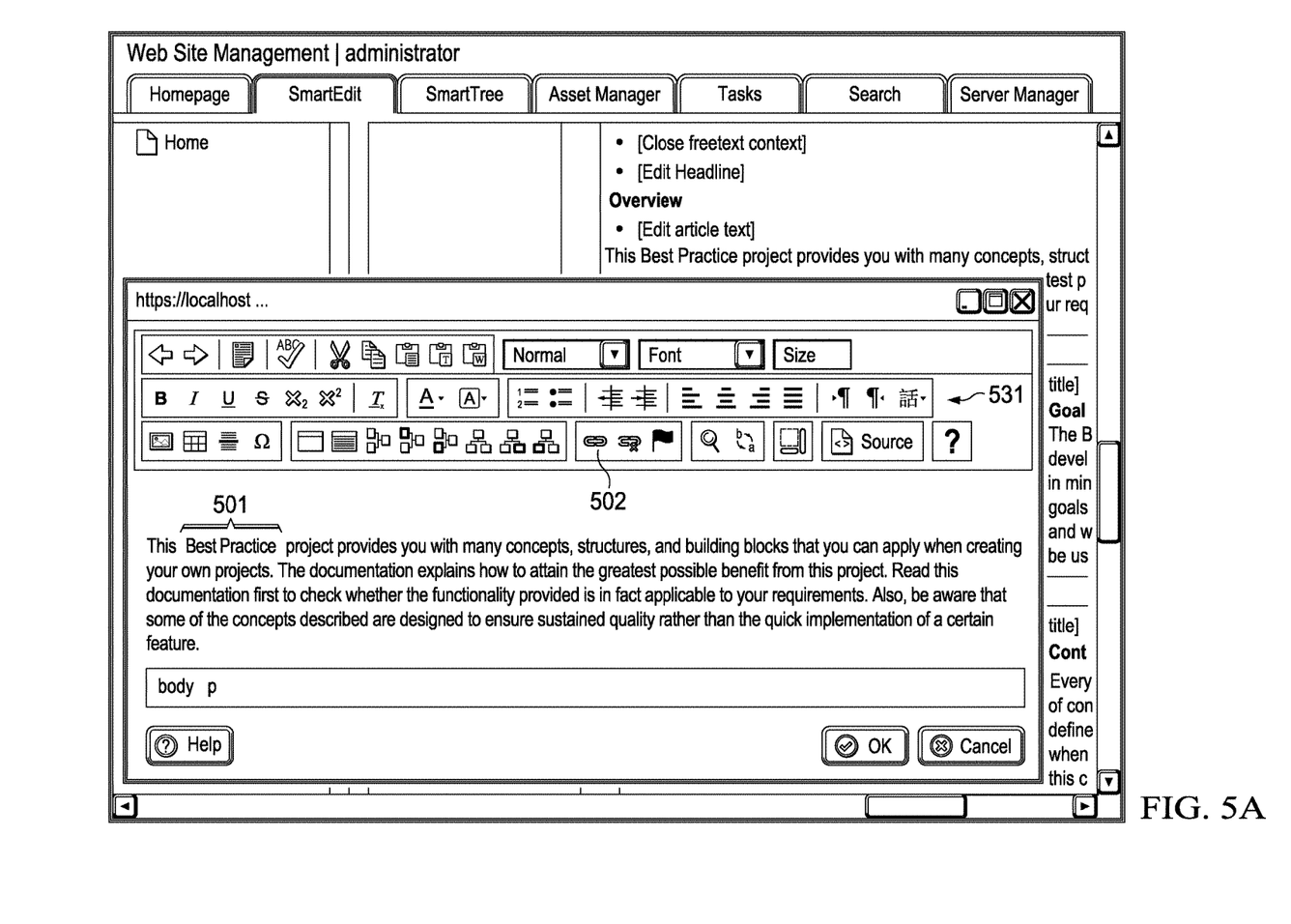
FIGS. 5A to 5D illustrate an example scenario of using the disclosed method and system in accordance with one embodiment of the invention.
Figure 5B:
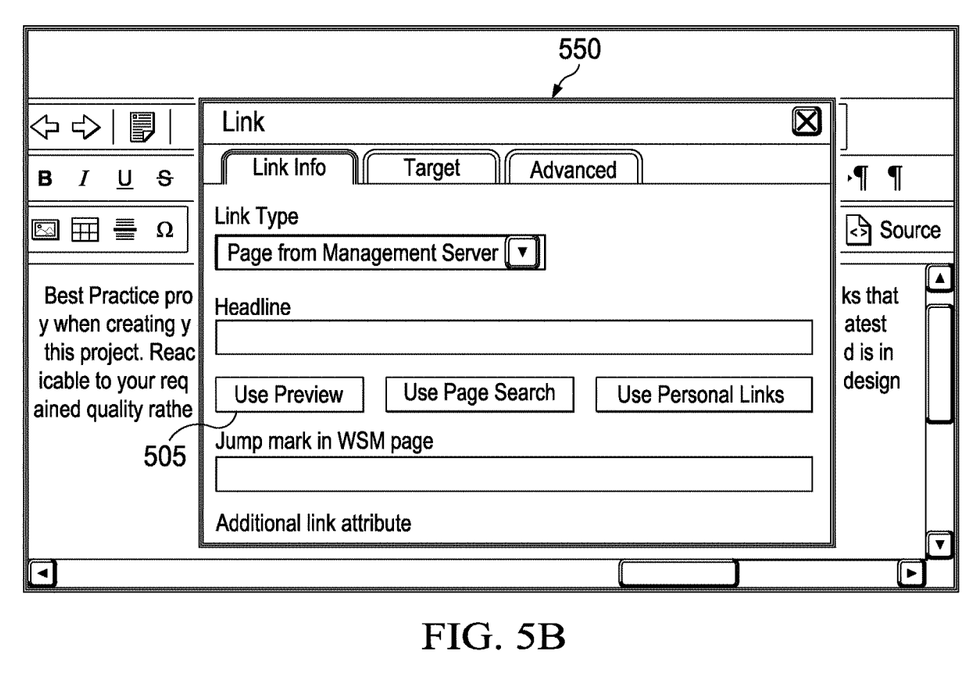
Figure 5C:
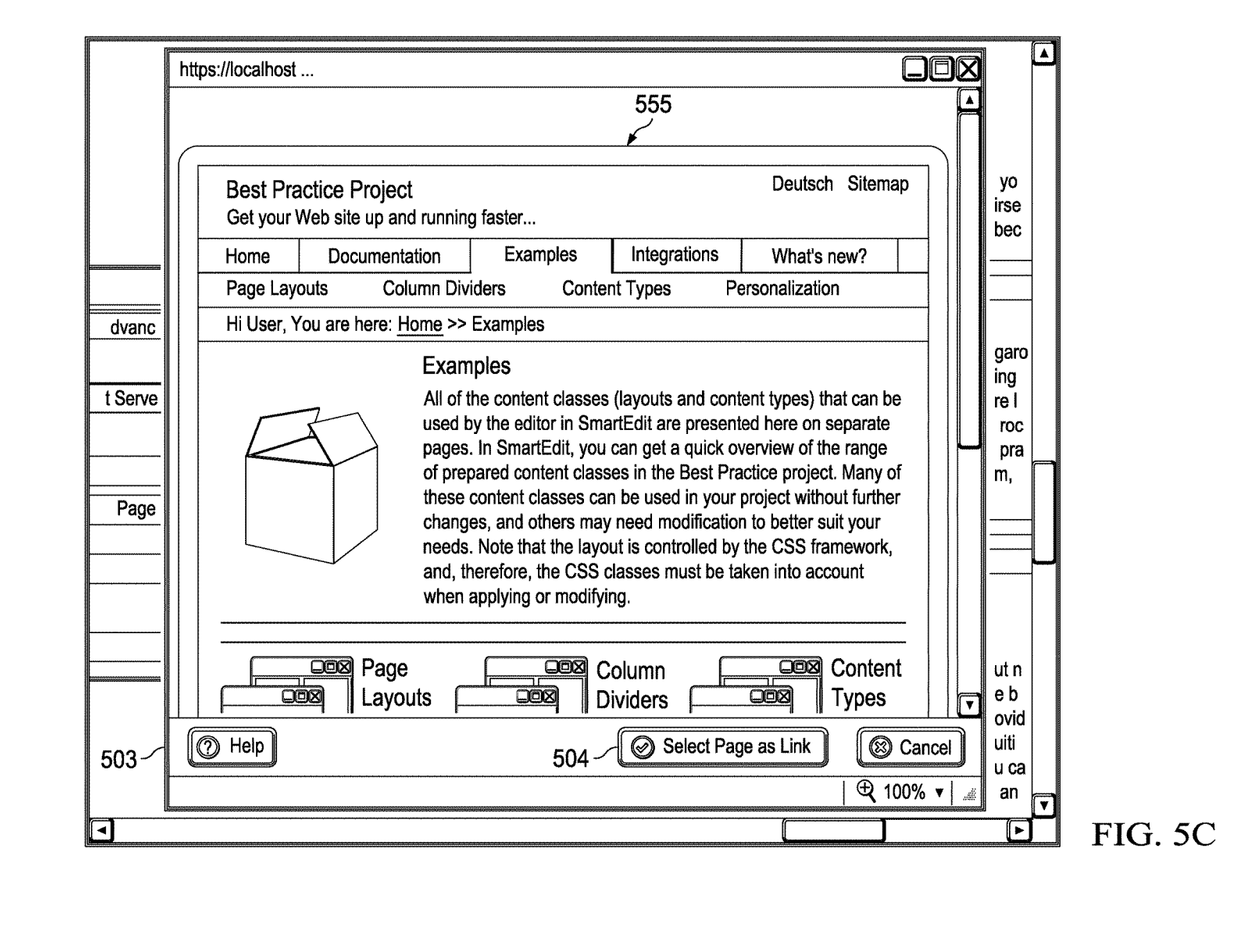
Figure 5D:
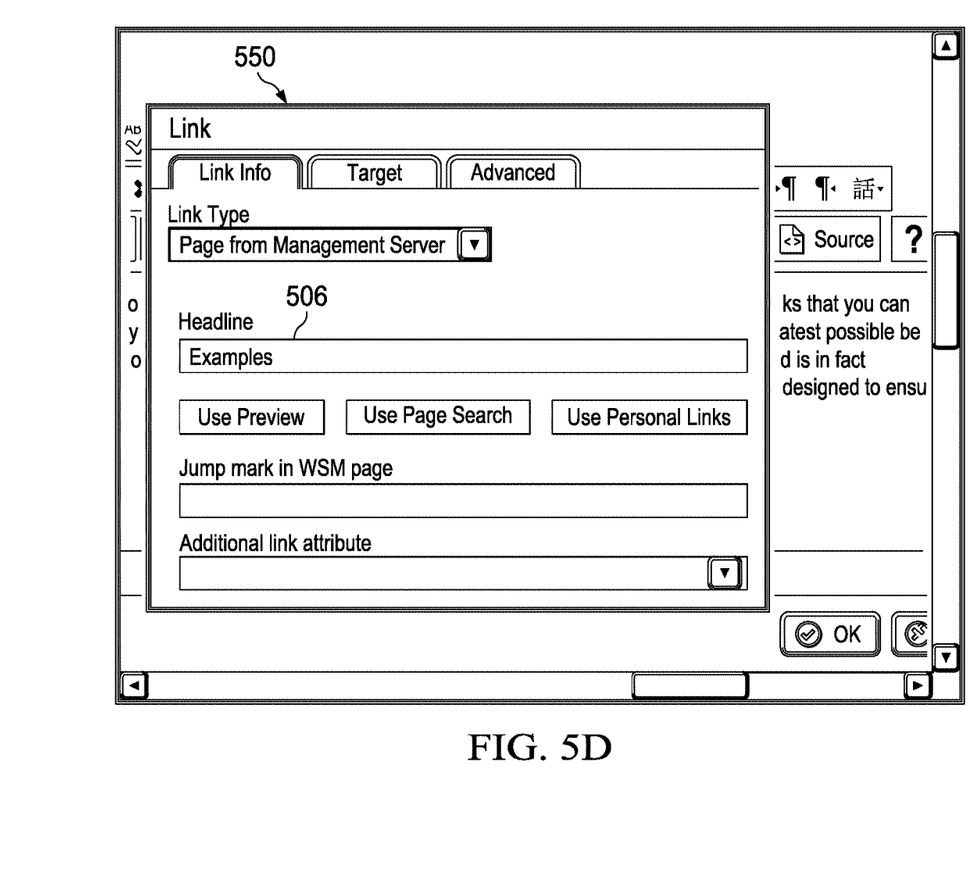

To be more specific, a rich text editor 531 (which can be an example of an editing tool 131 shown in FIG. 1) is used by an editor (e.g., editing user 110 shown in FIG. 1) to edit a content item of a web content project. See FIG. 5A. Here, the editor wants to select a link target for a managed object or a part thereof 501 (the words "Best Practice" in an article, for example) in order to provide additional information such as the definition thereof. To do so, in this example, the editor highlights or otherwise marks the words "Best Practice" and clicks on a button 502 associated with a link selection function to select a link target. In response, a link selection tool such as a SLS function 550 is opened by rich text editor 531, as shown in FIG. 5B. Therein, the editor can request via SLS function 550 to generate and display the preview, for example, by clicking on a button 505. In response thereto, a preview 555 is generated and displayed in a new window 503 of the browser, as shown in FIG. 5C. In preview 555, the editor can browse, surf, or otherwise navigate to the content page including a desired content item which, in this example, represents the additional information concerning "Best Practice", to be selected as a link target. To select the content item, the editor clicks on a button 504 (an example of an SLS selection means). Here, the example SLS selection means can enable selection of the entire content page as the link target. The editor may provide additional information for the link target thus selected via an input area or space 506 of SLS function 550, as shown in FIG. 5D. The link target is stored together with the additional information for the words "Best Practice". The editor may terminate SLS function 550 by closing the corresponding window and/or continue editing the managed object.

In accordance with the above described embodiments of the invention, the SLS function can be implemented as a link selection tool which can be used in several scenarios, including: (1) when a starting object is some part of a content item managed by the WCMS; (2) when the editing tool is a rich text editor; (3) when the type of the link target is another content item.

In general, the SLS function enables an editor (e.g., editing user 110 shown in FIG. 1) to select a content item indirectly by opening a preview (e.g., a preview window in browser 120). A preview of the content page is displayed as it would be published by the WCMS. The editor can then browse, surf, or otherwise navigate within the preview to the content page that contains the content item that the editor wants to select as a link target. A button (an example of an SLS selection means) is provided to enable the editor to select the content item of the displayed preview as a link target. Optionally, additional or other SLS selection means may enable the editor to select other content items displayed in the preview (e.g., by clicking on markers displayed when hovering with a mouse or other pointing device over the preview of the content page, or by selecting from an additional selection box, etc.).

Main advantages of using the method and system of the invention include: (1) An editor does not have to know names or other technical criteria of a link target content item, which is typically required by other link selection tools; (2) Compared with other link selection tools such as search, the link selection with the disclosed SLS function is significantly faster; (3) Due to the preview, the editor can gain intuitive confidence that the editor has selected the correct link target; and (4) The editor can leverage their own knowledge of the published web content project to select the link target.

The invention is preferably implemented by software, but can also be implemented in hardware or a combination of hardware and software. The invention can also be embodied as computer-readable code on a non-transitory computer-readable medium. The computer-readable medium is any data storage device that can store data which can thereafter be read by a computer system. Examples of the computer-readable medium include read-only memory, random-access memory, CD-ROMs, DVDs, magnetic tape, optical data storage devices, and carrier waves. The computer-readable medium can also be distributed over network-coupled computer systems so that the computer-readable code is stored and executed in a distributed fashion.

While this invention has been described in terms of several preferred embodiments, there are alterations, permutations, and equivalents, which fall within the scope of this invention.

It should also be noted that there are many alternative ways of implementing the methods and apparatuses of the invention.

It is therefore intended that the following appended claims be interpreted as including all such alterations, permutations, and equivalents as fall within the scope of the invention as defined by the appended claims.

The invention claimed is:

1. A method, comprising:
   receiving a request from a user to select a link target for a managed object or a part thereof, the managed object managed by a web content management system embodied on a computer, the computer having a processor, a non-transitory computer-readable medium, and stored instructions translatable by the processor, the receiving performed by an editing tool, the editing tool accessible by the user through an editing interface for website authoring, the editing interface running within a browser application on a user device communicatively connected to the web content management system, the managed object displayed by the editing tool within the browser application on the user device;
   responsive to the request from the user, presenting a link selection tool on the user device, the presenting performed by the editing tool;
   receiving, through the link selection tool, a preview request from the user device;
   responsive to the preview request, generating a preview of at least one content page of a web content project, the generating performed by a preview engine of the web content management system;
   adding smart link selection metadata to the preview generated by the preview engine, the adding performed by a preview enhancer, the smart link selection metadata comprising information of one or more content items on the at least one content page;

adding a smart link selection means to the preview generated by the preview engine, the adding performed by the preview enhancer;

after adding the smart link selection metadata and the smart link selection means to the preview generated by the preview engine, presenting or displaying, via the editing interface of the web content management system within the browser application on the user device, the preview of the at least one content page of the web content project with access to the one or more content items of the at least one content page of the web content project, the one or more content items stored in a database managed by the web content management system;

receiving a user indication that a content item presented or displayed in the preview has been selected via the smart link selection means;

determining an identifier of the content item selected via the smart link selection means, the determining performed by the web content management system based on the information of the content item in the smart link selection metadata added to the preview by the preview enhancer; and storing the identifier of the content item with the managed object as the link target such that when a content page including the managed object is processed by the web content management system for preview or display, the managed object is provided with a link to the content item using the identifier of the content item stored with the managed object.

2. The method of claim 1, further comprising:
verifying the content item using the smart link selection metadata.

3. The method of claim 2, wherein the verifying comprises at least one of checking whether the content item exists in the web content project, checking the type of the content item, or checking permission of the content item.

4. The method of claim 1, wherein the preview is generated for at least two content pages, and wherein the generating the preview further comprises adding navigation elements to the preview.

5. The method of claim 1, wherein the smart link selection metadata comprises at least one of a content item identifier, type of the content item, visualization data of the content item, or location information defining a location of the content item in the preview of the at least one content page.

6. The method of claim 1, wherein the smart link selection means comprises at least one of a button associated with at least one of the one or more content items, a list of content items enabled for selection on the at least one content page, or marking means displayed when hovering with a pointing device over the preview.

7. The method of claim 1, wherein the identifier of the content item is a value of a href attribute of an anchor target.

8. A web content management system, comprising:
a processor;
a non-transitory computer-readable medium; and
stored instructions translatable by the processor to perform:
providing an editing interface for website authoring, the editing interface running within a browser application on a user device communicatively connected to the web content management system;
receiving, from a user of the user device via the editing interface of the web content management system, a request to select a link target for a managed object or a part thereof, the managed object managed by the web content management system;
responsive to the request, presenting a link selection tool on the user device;
receiving, through the link selection tool, a preview request from the user device;
responsive to the preview request, generating a preview of at least one content page of a web content project;
adding smart link selection metadata to the preview, the smart link selection metadata comprising information of one or more content items on the at least one content page;
adding a smart link selection means to the preview;
after adding the smart link selection metadata and the smart link selection means to the preview, presenting or displaying, via the editing interface of the web content management system within the browser application on the user device, the preview of the at least one content page of the web content project with access to the one or more content items of the at least one content page of the web content project, the one or more content items stored in a database managed by the web content management system;
receiving a user indication that a content item presented or displayed in the preview has been selected via the smart link selection means;
determining an identifier of the content item selected via the smart link selection means, the determining performed based on the information of the content item in the smart link selection metadata added to the preview; and
storing the identifier of the content item with the managed object as the link target such that when a content page including the managed object is processed by the web content management system for preview or display, the managed object is provided with a link to the content item using the identifier of the content item stored with the managed object.

9. The system of claim 8, wherein the instructions are further translatable by the processor to perform:
verifying the content item using the smart link selection metadata.

10. The system of claim 9, wherein the verifying comprises at least one of:
checking whether the content item exists in the web content project, checking the type of the content item, or checking permission of the at least one selected content item.

11. The system of claim 9, wherein the preview is generated for at least two content pages, and wherein the instructions are further translatable by the processor to perform adding navigation elements to the preview.

12. The system of claim 9, wherein the smart link selection metadata comprises at least one of a content item identifier, type of the content item, visualization data of the content item, or location information defining a location of the content item in the preview of the at least one content page.

13. The system of claim 9, wherein the smart link selection means comprises at least one of a button associated with at least one of the one or more content items, a list of content items enabled for selection on the at least one content page, or marking means displayed when hovering with a pointing device over the preview.

14. The system of claim 9, wherein the identifier of the content item is a value of a href attribute of an anchor target.

15. A computer program product having a non-transitory computer-readable medium storing instructions translatable by a processor to perform:

provide an editing interface for website authoring, the editing interface running within a browser application on a user device communicatively connected to a web content management system;

receiving, from a user of the user device via the editing interface of the web content management system, a request to select a link target for a managed object or a part thereof, the managed object managed by the web content management system;

responsive to the request, presenting a link selection tool on the user device;

receiving, through the link selection tool, a preview request from the user device;

responsive to the preview request, generating a preview of at least one content page of a web content project;

adding smart link selection metadata to the preview, the smart link selection metadata comprising information of one or more content items on the at least one content page;

adding a smart link selection means to the preview;

after adding the smart link selection metadata and the smart link selection means to the preview, presenting or displaying, via the editing interface of the web content management system within the browser application on the user device, the preview of the at least one content page of the web content project with access to the one or more content items of the at least one content page of the web content project, the one or more content items stored in a database managed by the web content management system;

receiving a user indication that a content item presented or displayed in the preview has been selected via the smart link selection means;

determining an identifier of the content item selected via the smart link selection means, the determining performed based on the information of the content item in the smart link selection metadata added to the preview; and storing the identifier of the content item with the managed object as the link target such that when a content page including the managed object is processed by the web content management system for preview or display, the managed object is provided with a link to the content item using the identifier of the content item stored with the managed object.

16. The computer program product of claim 15, wherein the instructions are further translatable by the processor to perform:

verifying the content item using the smart link selection metadata.

17. The computer program product of claim 15, wherein the verifying comprises at least one of:

checking whether the content item exists in the web content project, checking the type of the content item, or checking permission of the content item.

18. The computer program product of claim 15, wherein the preview is generated for at least two content pages, and wherein the instructions are further translatable by the processor to perform adding navigation elements to the preview.

19. The computer program product of claim 15, wherein the smart link selection metadata comprises at least one of a content item identifier, type of the content item, visualization data of the content item, or location information defining a location of the content item in the preview of the at least one content page.

20. The computer program product of claim 15, wherein the smart link selection means comprises at least one of a button associated with at least one of the one or more content items, a list of content items enabled for selection on the at least one content page, or marking means displayed when hovering with a pointing device over the preview.

* * * * *